United States Patent
Kachman

(10) Patent No.: US 10,022,653 B2
(45) Date of Patent: Jul. 17, 2018

(54) WATER CATCHMENT AND SOIL TREATMENT SYSTEM

(71) Applicant: Christofer Jay Kachman, Tacoma, WA (US)

(72) Inventor: Christofer Jay Kachman, Tacoma, WA (US)

( * ) Notice: Subject to any disclaimer, the term of this patent is extended or adjusted under 35 U.S.C. 154(b) by 0 days.

(21) Appl. No.: 15/611,367

(22) Filed: Jun. 1, 2017

(65) Prior Publication Data

US 2017/0266588 A1 Sep. 21, 2017

Related U.S. Application Data

(63) Continuation-in-part of application No. 14/604,528, filed on Jan. 23, 2015, now Pat. No. 9,694,399.

(60) Provisional application No. 61/930,759, filed on Jan. 23, 2014.

(51) Int. Cl.

| *E02B 11/00* | (2006.01) |
|---|---|
| *B01D 24/02* | (2006.01) |
| *C02F 1/00* | (2006.01) |
| *B09C 1/00* | (2006.01) |
| *E02B 11/02* | (2006.01) |

(52) U.S. Cl.
CPC ............... *B01D 24/02* (2013.01); *C02F 1/001* (2013.01); *B01D 2101/005* (2013.01); *B09C 1/002* (2013.01); *E02B 11/005* (2013.01); *E02B 11/02* (2013.01)

(58) Field of Classification Search
CPC .. E01F 5/00; E01C 11/22; E02B 11/00; E02B 11/005
USPC .................. 405/36, 39, 42–45, 49; 404/2, 4; 52/169.5; 47/33
See application file for complete search history.

(56) References Cited

U.S. PATENT DOCUMENTS

| 7,794,176 B2 * | 9/2010 | Musser ................. E01C 11/227 404/4 |
| 2007/0294966 A1 * | 12/2007 | Andras .................. E02D 3/106 52/169.5 |

FOREIGN PATENT DOCUMENTS

JP    6-93612 A * 4/1994

* cited by examiner

*Primary Examiner* — Sunil Singh

(57) ABSTRACT

A water catchment and lawn edging system includes a cap, a channeled drain fixture, and at least one base clip. The base clip, which connects the system to the ground surface, is connected to a bottom end of the channeled drain fixture. Depending upon the length or the profile of the channeled drain fixture, the system can utilize a single base clip or a plurality of base clips to properly support the system. The cap is continuously connected along the channeled drain fixture from a top end of the channeled drain fixture. The cap may include a plurality of drain openings to provide additional drainage for the system. Collectively, the cap, the channeled drain fixture, and the base clip function as a water catchment and lawn edging system so that surface and ground water can be drained and filtered away from a collecting area and discharged into an outfall.

11 Claims, 9 Drawing Sheets

WATER CATCHMENT AND SOIL TREATMENT SYSTEM

The current application is a continuation-in-part (CIP) application of a U.S. non-provisional application Ser. No. 14/604,528 filed on Jan. 23, 2015. The U.S. non-provisional application Ser. No. 14/604,528 claims a priority to a U.S. provisional application Ser. No. 61/930,759 filed on Jan. 23, 2014.

FIELD OF THE INVENTION

The present invention relates generally to a drainage system. More specifically, the present invention is a water catchment and lawn edging system that simultaneously drains and collect excess water while functioning as a lawn edging for a designated area.

BACKGROUND OF THE INVENTION

Traditional drainage systems, such as French draining system, weeping tile system, rubble draining system, rock draining system, and land draining system, are utilized in different environments settings so that surface water and ground water can be collected and redirected. Most of the traditional drainage systems utilize gravitational force, where the excess amount of water is drained from a higher elevation to a lower elevation with the aid of the gravitational force.

The main problems of the existing drainage systems are the associated installation cost and maintenance cost. More specifically, the installation cost is higher due to the excavation area and excess amount of material used to install the drainage system. Due to complicated installation configurations, most the existing drainage systems tend to get clog overtime requiring additional maintenance cost. Additionally, almost all of the existing drainage systems only provide single filtration for the surface water and ground water. As a result, the drained water from the single filtration contaminates the outfall sources such as rivers and ponds.

It is therefore an object of the present invention to provide a water catchment and lawn edging system so that the present invention is able to provide an efficient drainage system while functioning as a lawn edging for a designated area. The present invention minimizes installation cost due to the shallow depth and narrow width of the trench. Additionally, the present invention also decreases the maintenance cost due to efficient design elements as the present invention completely eliminates unnecessary bends and turns that normally creates clogging within the system. The present invention also provides double filtration and bio filtration for the surface water and ground water so that the drained water can be reused and purified before it enters into the outfall sources.

DETAIL DESCRIPTIONS OF THE INVENTION

All illustrations of the drawings are for the purpose of describing selected versions of the present invention and are not intended to limit the scope of the present invention.

Figure 1:
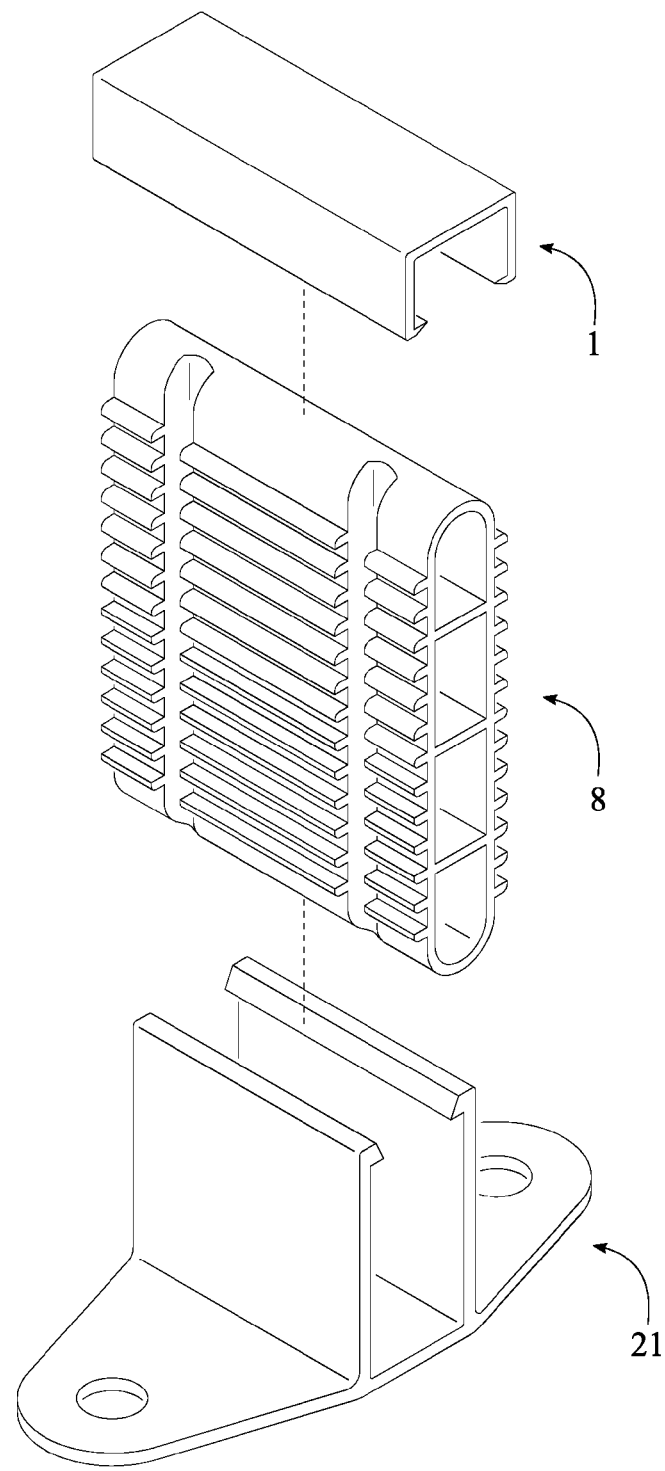
FIG. 1 is an exploded view of the present invention.

The present invention is a water catchment and lawn edging system so that the present invention is able to drain surface and ground water away from the collecting areas and into an outfall source. As a result, the present invention purifies surface and ground water before it enters the outfall sources such as rivers, ponds, designated land sites. The present invention also functions as a lawn edging due to its compact configuration. The present invention comprises a cap 1, a channeled drain fixture 8, and at least one base clip 21 as shown in FIG. 1. In reference the general configuration of the present invention, the base clip 21, which connects the present invention to the ground surface, is connected to a bottom end of the channeled drain fixture 8. Depending upon the length or the profile of the channeled drain fixture 8, the present invention can utilize a single base clip 21 or a plurality of base clips 21 in order to provide the proper structural support. The cap 1 is continuously connected along the channeled drain fixture 8 from a top end of the channeled drain fixture 8, wherein the cap 1 may or may not allow the surface water to drain. Then, the channeled drain fixture 8 is able to function as a water catchment while the cap 1, the channeled drain fixture 8, and the base clip 21 function as the lawn edging system.

The channeled drain fixture 8 connects in between the cap 1 and base clip 21 and functions as a water catchment system within the present invention. In reference to FIG. 2-3, the channeled drain fixture 8 comprises a main body 9, a plurality of drain notches 14, a pair of stop rails 16, a plurality of upper rails 19, and a plurality of lower rails 20. More specifically, the plurality of upper rails 19 is externally connected along an upper half 10 of the main body 9. The plurality of lower rails 20 is externally connected along a lower half 11 of the main body 9. In reference to FIG. 3, the plurality of upper rails 19 is connected along a first lateral surface 12 and a second lateral surface 13 of the main body 9 from the upper half 10 thus the first lateral surface 12 and the second lateral surface 13 are oppositely positioned of each other along the main body 9. Similarly, the plurality of lower rails 20 is connected along the first lateral surface 12 and the second lateral surface 13 from the lower half 11.

Figure 2:
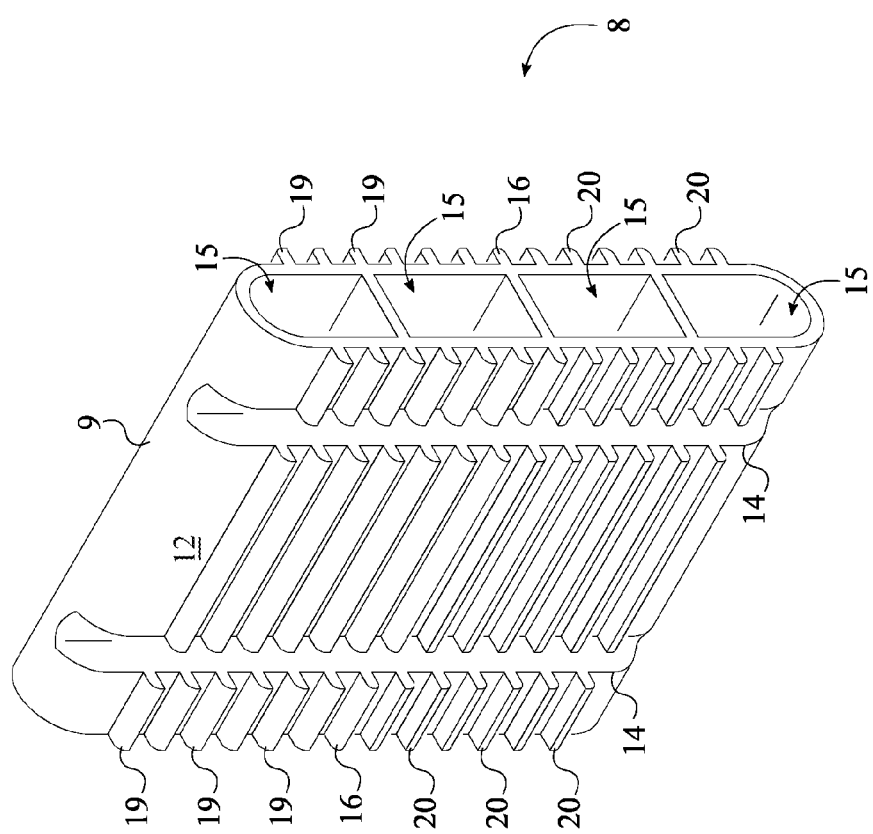
FIG. 2 is a perspective view of the channeled drain fixture of the present invention.
Figure 3:
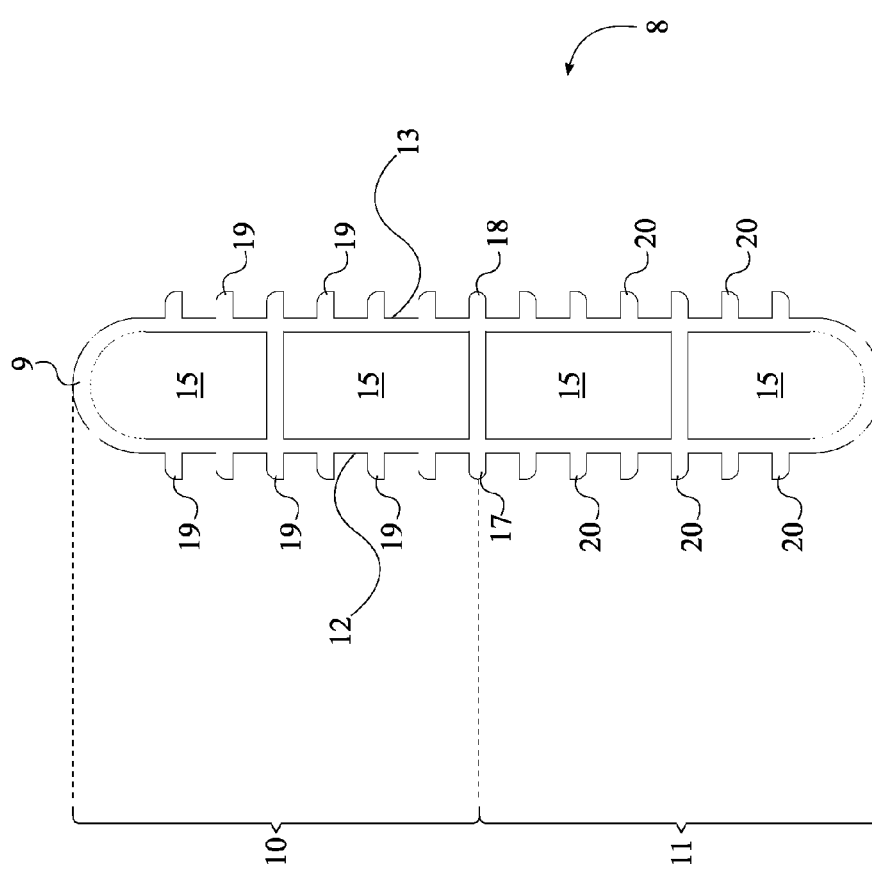
FIG. 3 is a front view of the channeled drain fixture of the present invention.

In reference to FIG. 2-3, the pair of stop rails 16 is externally connected along the main body 9 in between the plurality of upper rails 19 and the plurality of lower rails 20 so that the upper half 10 and the lower half 11 can be separated by the pair of stop rails 16. More specifically, the pair of stop rails 16 comprises a first stop rail 17 and a second stop rail 18 as the first stop rail 17 is centrally connected along the first lateral surface 12 and the second stop rail 18 is centrally connected along the second lateral surface 13. Due the positioning of the first stop rail 17 and the second stop rail 18, the plurality of upper rails 19 is positioned atop the pair of stop rails 16 while the plurality of lower rails 20 is positioned below the pair of stop rails 16.

The plurality of upper rails 19 and the plurality of lower rails 20 function as adjustable attachment members for cap 1 and the base clip 21. In other words, elongated positing of the plurality of upper rails 19 and the plurality of lower rails 20 along the main body 9 allow the user to control the total height of the present invention as the user can find multiple height levels for the cap 1 and the base clip 21. In order to provide proper clearance and connection for the cap 1, each of the plurality of upper rails 19 is equally spaced apart from each other about the upper half 10. Similarly, each of the plurality of lower rails 20 is equally spaced apart from each other about the lower half 11 in order to provide proper clearance and connection for the base clip 21.

Additionally, the plurality of upper rails 19 and the plurality of lower rails 20 are extended away from the main body 9 thus providing empty space between the main body 9 and at least one filtration medium 28 of the present invention. As a result, the present invention is able to maximize the drainage flowrate of the present invention due to the fact the plurality of upper rails 19 and the plurality of lower rails 20 stop heavy particle and material from reaching and clogging the plurality of drain notches 14.

The plurality of drain notches 14 allows surface and ground water to penetrate into the main body 9 so that the main body 9 is able to redirect the collected surface and ground water into the outfall sources. In reference to FIG. 2, the plurality of drain notches 14 is traversed through the plurality of upper rails 19, the plurality of lower rails 20, the first stop rail 17, and the first lateral surface 12. More specifically, each of the plurality of drain notches 14 is equally spaced apart from each other along the main body 9 and is extended across the upper half 10 and the lower half 11. In order to redirect the collected surface and ground water, the present invention further comprises a plurality of channels 15 that is traversed through the main body 9. Additionally, each of the plurality of channels 15 is distributed along the upper half 10 and the lower half 11. As a result, the plurality of drain notches 14 is in fluid communication with the plurality of channels 15 thus allowing surface and ground water to drain into the present invention through the plurality of drain notches 14 while the plurality of channels 15 transports the collected surface and ground water within the present invention.

Figure 5:
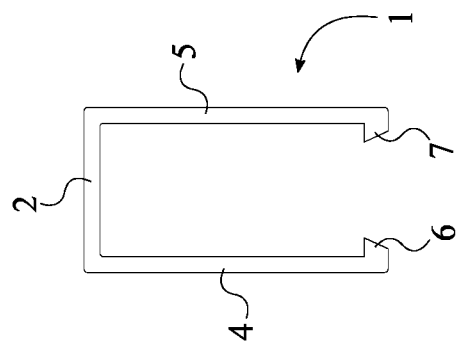
FIG. 5 is a front view of the cap of the present invention, wherein the base is a soil panel.
Figure 4:
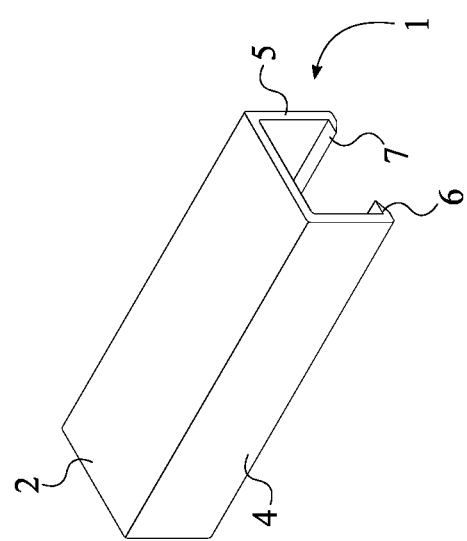
FIG. 4 is a perspective view of the cap of the present invention, wherein the base is a soil panel.
Figure 7:
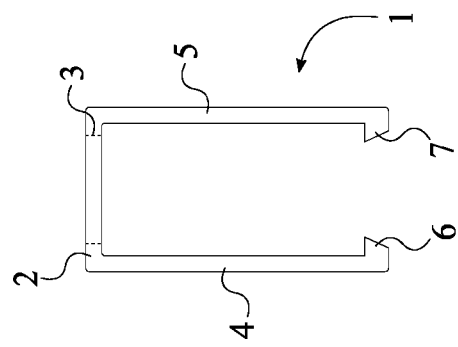
FIG. 7 is a front view of the cap of the present invention, wherein the base includes a plurality of drain openings.
Figure 6:
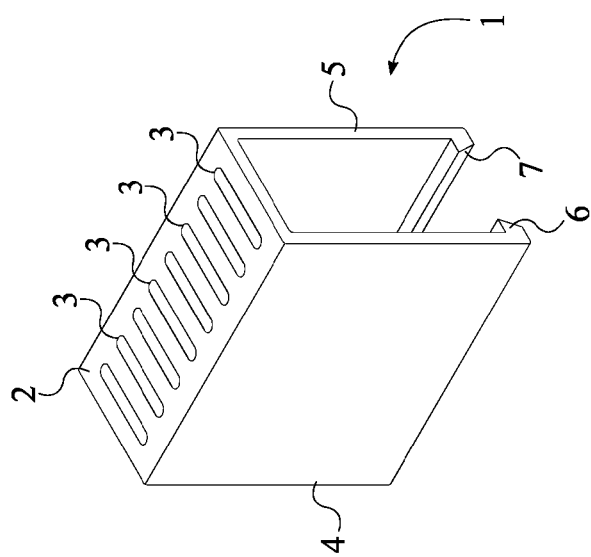
FIG. 6 is a perspective view of the cap of the present invention, wherein the base includes a plurality of drain openings.

The cap 1 that functions as a decorative body or a secondary draining body is continuously connected along the channeled drain fixture 8 from the top end as shown in FIG. 4-5. The cap 1 is adjustably engaged to the upper half 10 with the plurality of upper rails 19 and comprises a base 2, a first arm 4, a second arm 5, a first locking rail 6, and a second locking rail 7. More specifically, the first arm 4 is terminally connected to the base 2 and perpendicularly positioned to the base 2. The second arm 5 is terminally connected to the base 2 and perpendicularly positioned to the base 2. The first arm 4 and the second arm 5 are positioned parallel to each other along the base 2 thus delineating a U-shaped body for the cap 1. The first locking rail 6 that enables the cap 1 to be secured to the channeled drain fixture 8 about the first lateral surface 12 is connected along the first arm 4 and positioned opposite of the base 2. The second locking rail 7 that enables the cap 1 to be secured to the channeled drain fixture 8 about the second lateral surface 13 is connected along the second arm 5 and positioned opposite of the base 2. In reference to FIG. 4-5, the base 2 is a continuous panel when the cap 1 functions as a decorative body. In reference to FIG. 6-7, the present invention further comprises a plurality of drain openings 3 when the cap 1 functions as a secondary draining body. More specifically, the plurality of drain openings 3 is traversed through the base 2 in such a way that each of the plurality of drain openings 3 is equally spaced apart from each other along the base 2.

Figure 8:
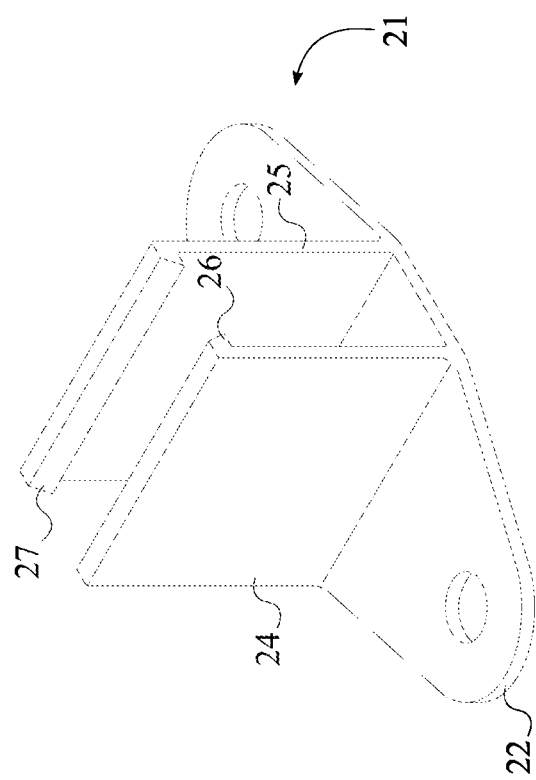
FIG. 8 is a perspective view of the base clip of the present invention.
Figure 9:
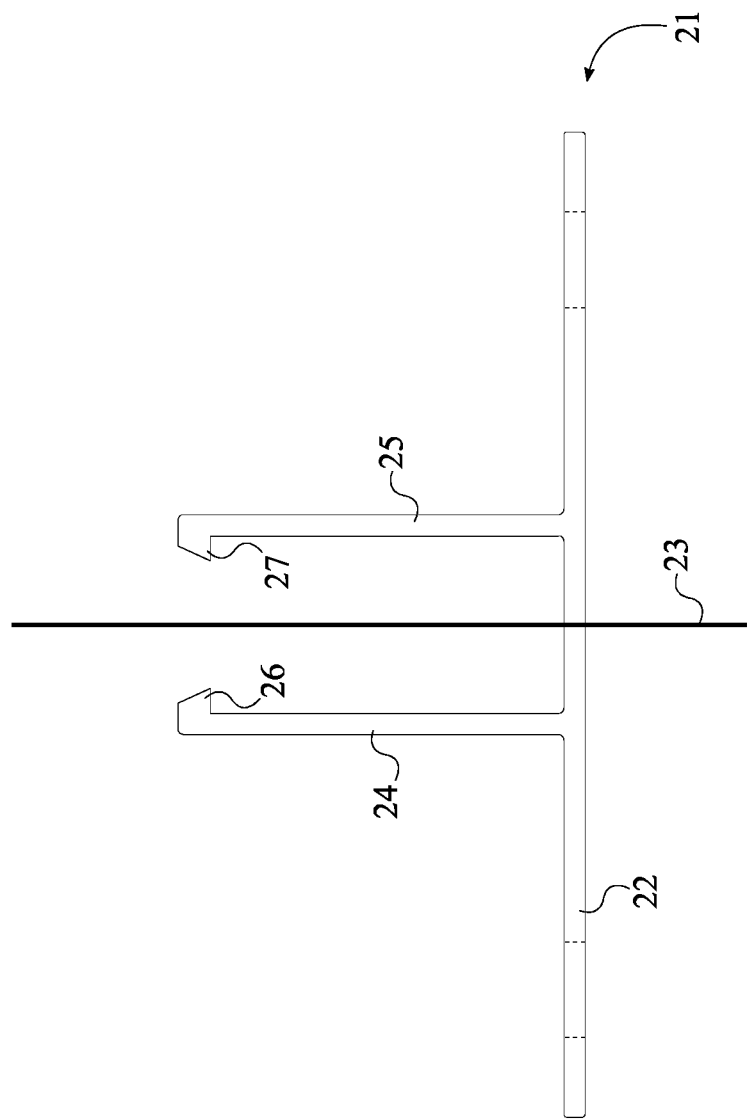
FIG. 9 is a front view of the base clip of the present invention.

The base clip 21 is adjustably engaged to the lower half 11 with the plurality of lower rails 20 and connects the channeled drain fixture 8 to the ground surface. The base clip 21 comprises a fastener plate 22, a first fixture support 24, a second fixture support 25, a first fastening rail 26, and a second fastening rail 27. In reference to FIG. 8-9, the first fixture support 24 and the second fixture support 25 are perpendicularly connected to the fastener plate 22 as the first fixture support 24 and the second fixture support 25 are oppositely positioned of each other about a sagittal plane 23 of the base clip 21. The distance between the first fixture support 24 and the second fixture support 25 allows the channeled drain fixture 8 to be inserted into the base clip 21. Additionally, the fastener plate 22 extends outward from the first fixture support 24 and the second fixture support 25 delineating two overhangs. The overhangs provide necessary surface area to fasten the present invention to the ground surface. In the preferred embodiment of the base clip 21 comprises a pair of triangular shaped overhangs. When a plurality of base clips 21 is utilized with the present invention, the pair of triangular shaped overhangs of each base clip 21 permits the channeled drain fixture 8 to easily attain a curve-profile around obstacles and corners as each base clip 21 can be angularly positioned with each other. The first fastening rail 26 and the second fastening rail 27 connect the base clip 21 to the channeled drain fixture 8 from the first lateral surface 12 and the second lateral surface 13, respectively. More specifically, the first fastening rail 26 is terminally connected along the first fixture support 24 and positioned opposite of the fastener plate 22. As a result, the first fastening rail 26 connects with the channeled drain fixture 8 about the first lateral surface 12. The second fastening rail 27 is terminally connected along the second fixture support 25 and positioned opposite of the fastener plate 22. As a result, the second fastening rail 27 connects with the channeled drain fixture 8 about the second lateral surface 13.

Figure 10:
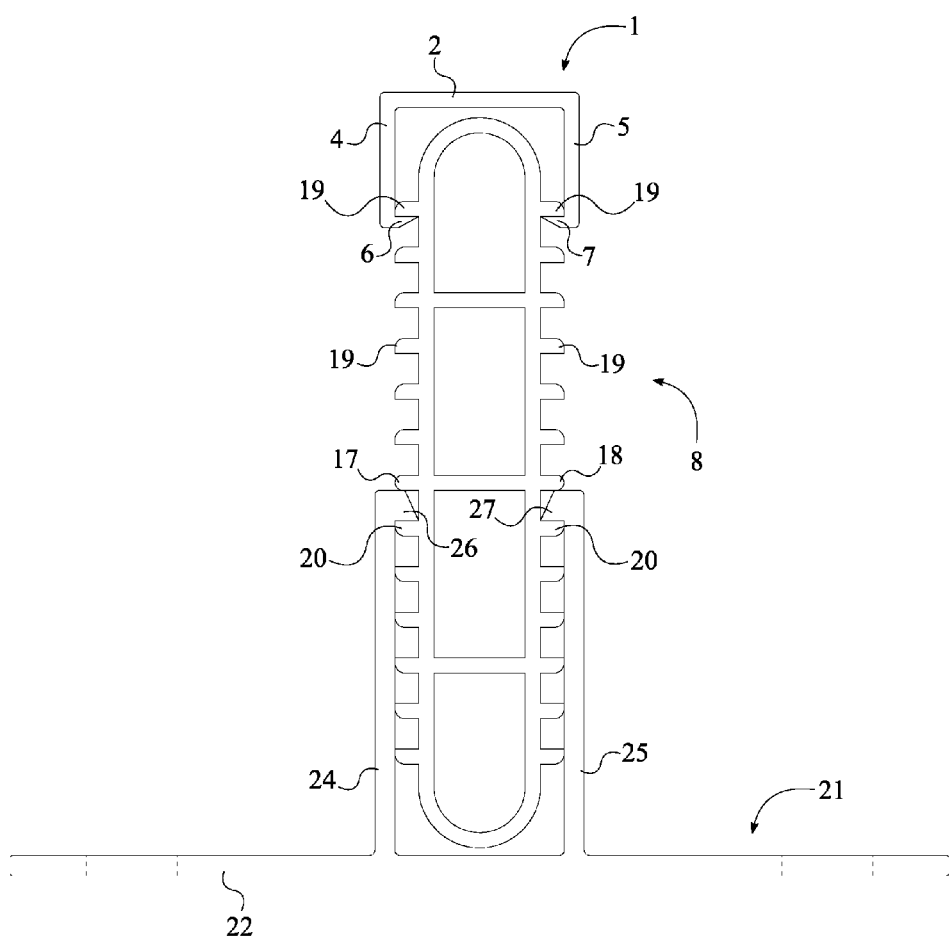
FIG. 10 is a front assembled view of the present invention.

In reference to the connection between the cap 1 and the channeled drain fixture 8 as shown in FIG. 10, the first locking rail 6 of the cap 1 is engaged to a first corresponding upper rail from the plurality of upper rails 19 about the first lateral surface 12, and the second locking rail 7 of the cap 1 is engaged to a second corresponding upper rail from the plurality of upper rails 19 about the second lateral surface 13. For example, the present invention can attain minimum height between the pair of stop rails 16 and the cap 1 when the first corresponding upper rail and the second corresponding upper rail are positioned proximal to the pair of stop rails 16. However, the present invention can attain maximum height between the pair of stop rails 16 and the cap 1 when the first corresponding upper rail and the second corresponding upper rail are positioned distal to the pair of stop rails 16.

In reference to the connection between the base clip 21 and the channeled drain fixture 8 as shown in FIG. 10, the first fastening rail 26 of the base clip 21 is engaged to a first corresponding lower rail from the plurality of lower rails 20 about the first lateral surface 12, and the second fastening rail 27 of the base clip 21 is engaged to a second corresponding lower rail from the plurality of lower rails 20 about the second lateral surface 13. For example, the present invention can attain minimum height between the pair of stop rails 16 and the base clip 21 when the first corresponding lower rail and the second corresponding lower rail are positioned proximal to the pair of stop rails 16. However, the present invention can attain maximum height between the pair of stop rails 16 and the base clip 21 when the first corresponding lower rail and the second corresponding lower rail are positioned distal to the pair of stop rails 16.

Figure 11:
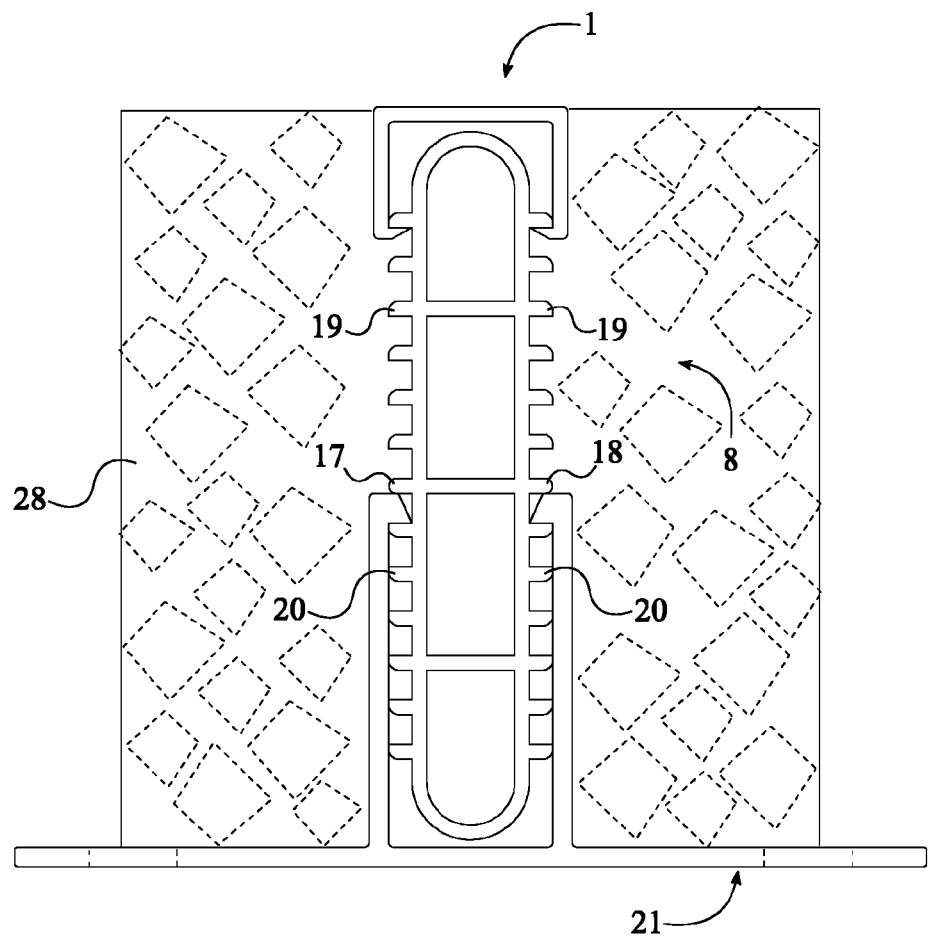
FIG. 11 is a front assembled view of the present invention, showing the filtration medium.

The filtration medium 28 provides additional filtration for surface and ground water before it reaches the channeled drain fixture 8 can include, but is not limited to, a chemical filter sock, sand and sediment filter sock, a composite filter sock, and pebbles. In reference to FIG. 11, the first lateral surface 12 and the second lateral surface 13 of the main body 9 are enclosed with the filtration medium 28. Additionally, the first arm 4 and the second arm 5 of the cap 1 are enclosed with the filtration medium 28. Furthermore, the first fixture support 24 and the second fixture support 25 of the base clip 21 are enclosed with the filtration medium 28. As a result, the filtration medium 28 is in fluid communication with the plurality of channels 15 through the plurality of drain notches 14 thus completing the drainage process for surface and ground water. More specifically, the filtration medium 28 allows surface and ground water to penetrate into the channeled drain fixture 8 while filtering out most of the sediments. Respective materials within the filtration medium 28 are sized to create interstitial spaces in between each other. Then, materials within the filtration medium 28 create particle bridging adjacent to the present invention so that particles from ground surface do not penetrates into the channeled drain fixture 8 as only surface and ground water drains through the filtration medium 28, the plurality of upper rails 19, the plurality of lower rails 20, and the plurality of drain notches 14.

Since surface and ground water is filtered through the filtration medium 28 and the channeled drain fixture 8, larger to finer sediments of surface and ground water are removed so that the present invention is able to efficiently discharge collected surface and ground water into the outfall source. The removal of the excess surface and ground water combined with the greatly improved habitat and food supplied for microorganisms in the filtration medium 28 strengthen the symbiotic relationship, providing food and water for the lawn as it needed for sustainable growth. On the other hand, less water and fertilizer are applied to maintain a healthy lawn, wherein the present invention creates an eco-friendly process. The compact size of the present invention is also able to provide a cost-effective water catchment and lawn edging system compare to existing drainage systems and lawn edging systems. As a result, the present invention is able to save money and time during the installation process compare to existing drainage system due to simplified configuration, small number of components, reliability of the components, and multiple functionality of the present invention. For example, installers need to remove less amount of dirt to create a trench so that the present invention can be secured to the ground surface thus resulting low labor cost for installation and maintenance cost.

The cap 1, the channeled drain fixture 8, and the base clip 21 can be made of non-corrosive and semi-rigid materials include, but are not limited to, ceramic, plastic, alloy, Polyvinyl chloride (PVC), Acrylonitrile butadiene styrene (ABS), and composite as the material can differ depending on specific site conditions and volume of drained water.

Although the invention has been explained in relation to its preferred embodiment, it is to be understood that many other possible modifications and variations can be made without departing from the spirit and scope of the invention as hereinafter claimed.

What is claimed is:

1. A water catchment and lawn edging system comprising:
   a cap;
   a channeled drain fixture;
   at least one base clip;
   the channeled drain fixture comprising a main body, a plurality of drain notches, a pair of stop rails, a plurality of upper rails and a plurality of lower rails;
   the main body comprising an upper half section, a lower half section, a first lateral surface, a second lateral surface, a top surface and a bottom surface;
   the first lateral surface and the second lateral surface being oppositely positioned of each other along the main body;
   the top surface and the bottom surface being oppositely positioned of each other along the main body;
   the top surface and the bottom surface being located in between the first lateral surface and the second lateral surface;
   the plurality of upper rails being externally connected along the upper half section;
   the plurality of lower rails being externally connected along the lower half section;
   the pair of stop rails being externally connected along the main body in between the plurality of upper rails and the plurality of lower rails;
   each of the plurality of drain notches being extended across the upper half section and the lower half section;
   each of the plurality of drain notches traversing through the plurality of upper rails, the plurality of lower rails, the first lateral surface, the top surface and the bottom surface;
   the cap being adjustably engaged to the upper half section with the plurality of upper rails;
   the at least one base clip being adjustably engaged to the lower half section with the plurality of lower rails;
   the at least one base clip comprising a fastener plate;
   the fastener plate being located parallel to a transverse plane of the at least one base clip;
   the fastener plate comprising an overhang;
   the overhang being located parallel to the transverse plane; and
   the overhang being of triangular-shaped.

2. The water catchment and lawn edging system as claimed in claim 1 comprising:
   the cap comprising a base, a first arm, a second arm, a first locking rail and a second locking rail;
   the first arm being terminally connected to the base;
   the first arm being perpendicularly positioned to the base;
   the second arm being terminally connected to the base;
   the second arm being perpendicularly positioned to the base;
   the first arm and the second arm being positioned parallel to each other along the base;
   the first locking rail being connected along the first arm, opposite of the base; and
   the second locking rail being connected along the second arm, opposite of the base.

3. The water catchment and lawn edging system as claimed in claim 2 comprising:
   a plurality of drain openings;
   the plurality of drain openings traversing through the base; and each of the plurality of drain openings being equally spaced apart from each other along the base.

4. The water catchment and lawn edging system as claimed in claim 1 comprising:
the pair of stop rails comprising a first stop rail and a second stop rail;
the first stop rail being centrally connected along the first lateral surface;
the plurality of drain notches traversing through the first stop rail; and
the second stop rail being centrally connected along the second lateral surface.

5. The water catchment and lawn edging system as claimed in claim 1 comprising:
the plurality of upper rails being connected along the first lateral surface and the second lateral surface; and
each of the plurality of upper rails being equally spaced apart from each other.

6. The water catchment and lawn edging system as claimed in claim 1 comprising:
the plurality of lower rails being connected along the first lateral surface and the second lateral surface; and
each of the plurality of lower rails being equally spaced apart from each other.

7. The water catchment and lawn edging system as claimed in claim 1 comprising:
a plurality of channels;
each of the plurality of drain notches being equally spaced apart from each other along the main body;
the plurality of channels traversing through the main body;
each of the plurality of channels being distributed along the upper half section and the lower half section; and
the plurality of drain notches being in communication with the plurality of channels.

8. The water catchment and lawn edging system as claimed in claim 1 comprising:
the at least one base clip comprising a first fixture support, a second fixture support, a first fastening rail and a second fastening rail;
the first fixture support and the second fixture support being perpendicularly connected to the fastener plate;
the first fixture support and the second fixture support being oppositely positioned of each other about a sagittal plane of the at least one base clip;
the first fastening rail being terminally connected along the first fixture support, opposite of the fastener plate; and
the second fastening rail being terminally connected along the second fixture support, opposite of the fastener plate.

9. The water catchment and lawn edging system as claimed in claim 1 comprising:
a first locking rail of the cap being engaged to a first corresponding upper rail from the plurality of upper rails about the first lateral surface; and
a second locking rail of the cap being engaged to a second corresponding upper rail from the plurality of upper rails about the second lateral surface.

10. The water catchment and lawn edging system as claimed in claim 1 comprising:
a first fastening rail of the at least one base clip being engaged to a first corresponding lower rail from the plurality of lower rails about the first lateral surface; and
a second fastening rail of the at least one base clip being engaged to a second corresponding lower rail from the plurality of lower rails about the second lateral surface.

11. The water catchment and lawn edging system as claimed in claim 1 comprising:
at least one filtration medium;
the first lateral surface and the second lateral surface being enclosed with the at least one filtration medium;
a first arm and a second arm of the cap being enclosed with the at least one filtration medium;
a first fixture support and a second fixture support of the at least one base clip being enclosed with the at least one filtration medium; and
the at least one filtration medium being in communication with a plurality of channels of the main body through the plurality of drain notches.

* * * * *